Sept. 20, 1932.  J. M. NICHOLS  1,878,641
TWO-PART PISTON RING
Filed Nov. 1, 1929
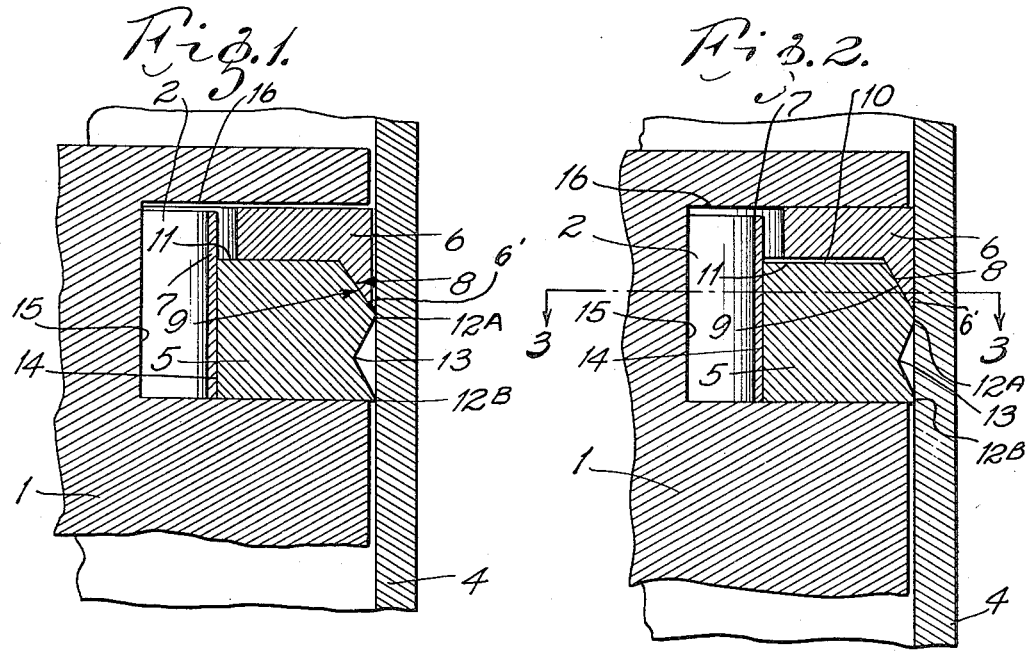
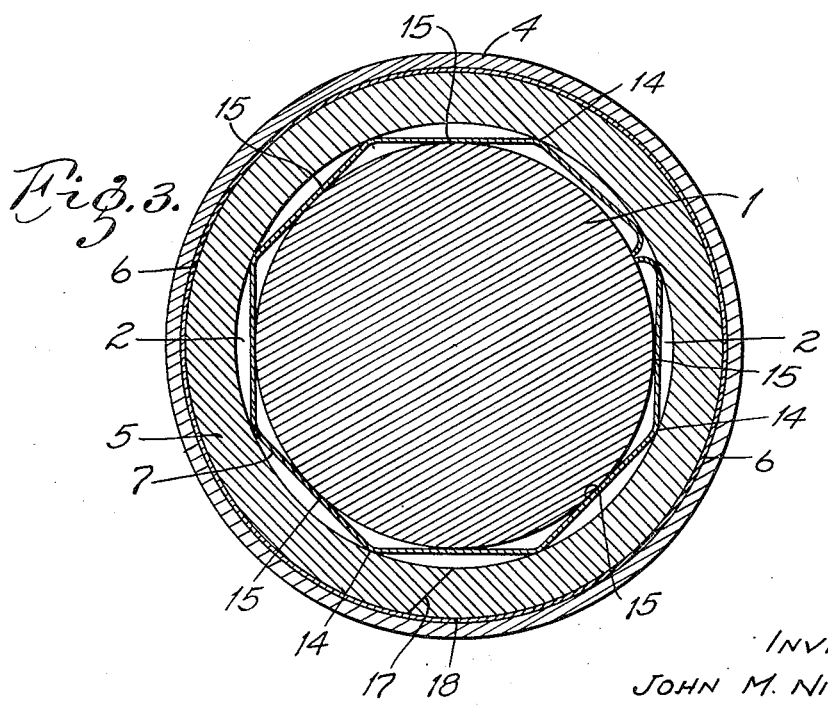
INVENTOR:
JOHN M. NICHOLS.
By James L. Hopkins,
ATTORNEY.

Patented Sept. 20, 1932

1,878,641

UNITED STATES PATENT OFFICE

JOHN M. NICHOLS, OF ST. LOUIS, MISSOURI, ASSIGNOR TO B. & N. RING MANUFACTURING COMPANY, OF ST. LOUIS, MISSOURI, A CORPORATION OF MISSOURI

TWO-PART PISTON RING

Application filed November 1, 1929. Serial No. 403,953.

This invention relates to improvements in two-part piston rings and the object of the invention is to improve piston rings particularly suitable for use in internal combustion engines, ice machines, hydraulic hoists, air compressors, whereby a more perfect operation may be obtained, and whereby a snug and proper fit of the ring in the ring groove and against the cylinder is assured, thus more effectively preventing leakage past the ring; a further object is to provide a ring which is not likely to become jammed or wedged within the cylinder, jammed or wedged within the ring groove of the piston, thereby holding itself within the ring groove and in exerting the proper pressure against the cylinder and thus eliminating the resulting knock and other troubles as well as leakage past the outside face of the piston ring or leakage around the side past the back and out the other side of the piston ring as it sits in the groove, causing loss of efficiency.

In the drawing—

Fig. 1 is an enlarged longitudinal fragmentary section of a portion of a cylinder and piston therein with this improved ring in place, the ring being shown in its original form in the piston groove when initially installed and before any wear has occurred.

Fig. 2 is a section taken similarly to Fig. 1 showing the portion of the ring after the initial wear has occurred.

Fig. 3 is a transverse section through a cylinder and piston therein, with this improved ring in place, the section being taken on the line 3—3 of Fig. 2.

This invention is applicable to any ordinary piston 1 having a circumferential ring groove 2 and mounted within a cylinder 4.

This improved ring comprises an inner or basic ring-member 5, split at 17, and a secondary ring-member 6, split at 18. Each of these members is narrower than the ring groove 2 and is of smaller diameter than the cylinder 4, so that normally the ring would slide loosely through the cylinder and under heat conditions of an internal combustion motor, the section ends of members 5 and 6 would not abut as a result of the expansion of the metal.

The ring-members 5 and 6 are also made of relatively soft material (with relation to the material of the cylinder) so that of themselves they have no resilient engagement against the cylinder wall, but depend entirely upon the outward pressure of the polygonal spring or expander 7 mounted within the ring groove 2 and contacting at various points on the bank or inner side of ring groove 2 and contacting at other points on the inner side of ring section 5. These contacts on the inner side of ring section 5 give the ring section 5 its outward or radial expansion for proper pressure against the cylinder. Said spring 7 does not contact at any time with the ring-member 8.

The ring-members are formed with meeting faces 8 and 9 inclined obliquely to the axis of the ring. The oblique face 8 of the outer ring forms the inner face of a flange 6' depending from section 6 and originates at its top edge in a flat face 10 disposed parallel to the plane of the ring and the oblique face 9 of the inner ring section 5 originates at its top edge in a flat face 11, also disposed parallel to the plane of the ring. The oblique angle 9 of inner member 5 ends its lower point at 12—A where the face of the inner member 5 contacts with the cylinder wall at the top contacting point of the face of inner member 5.

The ring member 5 is provided upon its outer face with a peripheral groove, the bottom of which groove is indicated as 13, and the apices of the side-walls of said groove being indicated as ridges 12—A and 12—B.

The ridges 12—A and 12—B of the inner section 5 project beyond the outer face of the outer member 6, and said outer peripheral edges 12—A and 12—B of the inner section 5 form two thin circumferential ridges 12—A and 12—B projecting beyond the outer face of the outer section 6, the purpose of which will presently be explained.

The polygonal spring or expander 7 has a number of flat faces as indicated in Fig. 3, the meeting angulations of said faces being the contacting portions interposed between the base of the ring groove 2 and the inner face of the member 6.

When initially installed, the only portions of the entire ring which engage the cylinder wall are the two thin circumferential ridges 12—A and 12—B. The groove 13 is of smaller diameter than the ridges 12—A and 12—B to allow said ridges to contact the cylinder wall for the purpose of reducing the imposed surface against the cylinder wall, and in addition, to carry a film of lubricant; also for quick wearing or seating features.

A flat spring 7 is mounted within the ring groove 2 behind the inner section of 5. Said spring 7 being narrower in width than ring groove 2. This spring is of peculiar shape and contains bends 14, so as to only contact the inner side of section 5 at various points. Due to this form of spring it bears against the piston 1 in groove 2 at various points 15 and against the inner ring section at various points 14.

When this ring is initially installed the outer ring-member 6 is superimposed upon the inner ring-member 5 and the spring 7 will expand the inner section, so that the two thin circumferential projecting ridges 12—A and 12—B are pressed against the cylinder wall, and since the normal diameter of the outer member 6 is less than that of the cylinder, when thus initially installed this outer section simply rests loosely upon the inclined face of the inner member, but does not contact with the cylinder wall 4 (see Fig. 1).

From the above explanation it will be evident that when initially installed the outer member 6 is quite loose, and when the engine is first run the oil may freely work up and around the ring sections. As running continues, the two thin circumferential ridges 12—A and 12—B immediately wear and this wear is immediately compensated for by the spring 7 expanding the inner ring member 5 and maintaining it pressed against the cylinder wall 4.

As this wear continues, with the resultant outward or radial expansion of the inner ring section 5, and the knife-like edges 12—A and 12—B continue to wear—the outer face of outer member 6 almost immediately contacts the cylinder wall—when the top portion which is parallel to the plane of the ring on outer section 6 engages the top 16 of the piston ring groove 2, the outer section is expanded thereby, so that the ring as a whole expands laterally to properly fill the ring groove 2 laying pressure against the top and bottom sides of the ring groove 2 and radially, so that the outer face of the outer section 6 is pressed against the cylinder wall 4 (see Fig. 2).

Thus as soon as the initial wear has taken place, the ring is expanded both laterally and radially to effectively and fully fill the ring groove 2 and the meeting faces 8 and 9 of the oblique angles of the members 5 and 6 are firmly pressed together, and said ring members are pressed tightly against the cylinder wall to prevent any leakage past the face of the ring or around behind the ring in the groove 2. As soon as the outer face of the member 6 contacts with cylinder wall 4, this wide contacting surface shields ridges 12—A and 12—B on inner member 5 and immediately stops excessive wear of these ridges diminishing said wear to a normal amount.

As lateral wear in the groove continues, the ring will continue to automatically expand as required to compensate for all wear until the groove 13 of inner section 5 contacts the cylinder wall. At this time lateral expansion ceases, but because groove 13 is approximately .030" less in diameter than point 12—A and 12—B, said sections 6 and 5 will continue to expand laterally, filling a worn groove not to exceed .030".

Said lateral expansion of the assembled ring can be controlled by reducing or increasing diameter of groove 13.

Serious trouble has been experienced in two-piece piston rings of this class due to the outer section being forced down over the inner section—thus causing the sections to jam or wedge in the cylinder or causing the sections to jam or wedge into the groove resulting in knocking and other motor troubles.

The wedging or jamming of the ring in the groove or against the cylinder has been entirely overcome by the provisions of the faces 10 and 11 which portions when the ring is installed are in juxtaposition and form opposed shoulders which come into engagement should the sections tend to slide unduly axially past each other. By this means the extent to which the outer section can slide down over the inner section is positively limited, and jamming and wedging of the ring in the cylinder is positively prevented.

From the foregoing it will be evident that I have devised improvements in piston rings of the type illustrated in United States Letters Patent No. 1,698,988 issued January 15, 1929.

In the described piston ring there will be no laterally separating surfaces connecting with the face of the ring, therefore, no wedge or jam can be caused between the two superimposed sections causing the ring to wedge or lock into the groove; furthermore, no indenture exists or will be created between the two sections, caused by lateral expansion in which carbon may form to defeat the function of the ring.

The only place on the face of the ring in which carbon may accumulate is in the groove 13 on lower member 5, and not between sections, and carbon accumulating in this groove would not affect the function of the assembled ring nor cause it to stick or wedge into the groove.

Variations of the described members may be effected without departure from my actual invention as defined in the appended claim.

I claim—

In combination with a piston having a piston ring groove, a piston ring comprising two co-operating elements disposed in said groove, one of said elements being thicker than the other and forming a base ring on which the thinner element is superimposed, said base ring having a series of outwardly presented inclined intersecting faces forming spaced ridges adapted to contact with the cylinder wall, said upper ring element having a depending flange with an inner inclined face for engagement with the upper inclined face of the base element, and an expander ring within the base element adapted to exert radial pressure on said element, said base element operating to urge the upper element both upwardly and outwardly.

In testimony whereof I have hereunto affixed my signature.

JOHN M. NICHOLS.